UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF MAKING ALKALI PERBORATES.

No. 842,473.  Specification of Letters Patent.  Patented Jan. 29, 1907.

Original application filed February 7, 1906, Serial No. 299,901. Divided and this application filed October 26, 1906. Serial No. 340,688.

*To all whom it may concern:*

Be it known that I, OTTO LIEBKNECHT, a subject of the German Emperor, and a resident of Frankfort-on-the-Main, Germany, have invented a certain new and useful Process of Making Alkali Perborates, of which the following is a specification and which is a division of my application Serial No. 299,901, filed February 7, 1906.

My invention relates to a new process of making alkali perborates, which process has proved easy in operation and of a high degree of efficiency. I have discovered that if an alkali peroxid, such as sodium peroxid, in solution or in suspension in water is treated with an alkali borate, such as borax, and an alkali bicarbonate, such as sodium bicarbonate, perborate is formed and precipitated in an alkaline solution. As a result of my process, besides the perborate a pure concentrated solution of carbonate is obtained, which can be used for other purposes.

In the following I have described one illustrative method of carrying out the process as applied to the manufacture of sodium perborate, the features thereof being more particularly pointed out hereinafter in the claims.

Three hundred and eighty-two parts of borax are stirred into two thousand parts of water, and then three hundred and twelve parts of sodium peroxid are added, together with sufficient ice so that no increase in temperature takes place. Then gradually add two hundred and fifty-four parts of sodium bicarbonate in powdered form and at the same time ice-water or ice in such quantities that at the end of the operation the temperature of the mixture is preferably from 0° to 2° centigrade.

The reaction of the illustrative process set forth is:

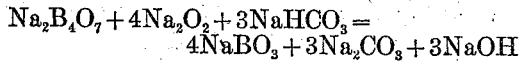

$$Na_2B_4O_7 + 4Na_2O_2 + 3NaHCO_3 = 4NaBO_3 + 3Na_2CO_3 + 3NaOH$$

It will be of advantage to stir during the entire operation. When the reaction is completed, the precipitate of perborate is separated from the sodium-carbonate solution, washed out, and dried in the usual manner.

In the illustrative example stated it is obvious that many variations in proportions and substances used, as well as in the steps of the process itself, may be practiced without departing from the spirit of my invention. For instance, sodium peroxid may be replaced by other alkali peroxid, such as sodium-potassium peroxid or potassium peroxid, as long as there is enough alkali in the form of a salt present to produce perborate as a result of the reaction, and instead of sodium bicarbonate other alkali bicarbonates, such as potassium bicarbonate, may be used.

What I claim, and desire to secure by Letters Patent, is—

1. The process of making alkali perborates which consists in reacting on borax with an alkali peroxid and an alkali bicarbonate.

2. The process of making sodium perborate which consists in reacting on borax with sodium peroxid and an alkali bicarbonate.

3. The process of making sodium perborate which consists in reacting on borax with an alkali peroxid and sodium bicarbonate.

4. The process of making sodium perborate which consists in reacting on borax with sodium peroxid and sodium bicarbonate.

In witness whereof I have hereunto signed my name in the presence of two subscribing witnesses.

OTTO LIEBKNECHT.

Witnesses:
 HORSH. ZIEGLER,
 JEAN GRUND.